US012792324B2

(12) United States Patent
Galante et al.

(10) Patent No.: US 12,792,324 B2
(45) Date of Patent: Nov. 10, 2026

(54) CODE CLASSIFICATION FOR LINK-TIME CODE PLACEMENT

(71) Applicant: Silicon Laboratories Inc., Austin, TX (US)

(72) Inventors: Christian Galante, LaSalle (CA); Jean Francois Deschenes, Ste-Marthe-sur-le-lac (CA)

(73) Assignee: Silicon Laboratories Inc., Austin, TX (US)

( * ) Notice: Subject to any disclaimer, the term of this patent is extended or adjusted under 35 U.S.C. 154(b) by 267 days.

(21) Appl. No.: 18/646,907

(22) Filed: Apr. 26, 2024

(65) Prior Publication Data

US 2025/0335166 A1 Oct. 30, 2025

(51) Int. Cl.
*G06F 8/54* (2018.01)
*G06F 8/41* (2018.01)
*G06F 8/73* (2018.01)

(52) U.S. Cl.
CPC .................. *G06F 8/44* (2013.01); *G06F 8/54* (2013.01); *G06F 8/73* (2013.01)

(58) Field of Classification Search
None
See application file for complete search history.

(56) References Cited

U.S. PATENT DOCUMENTS 6,212,632 B1* 4/2001 Surine .................. G06F 9/4401 711/170
2005/0262486 A1* 11/2005 Grebenev .............. G06F 8/423 717/169
2006/0123401 A1* 6/2006 O'Brien .................... G06F 8/45 717/131
2009/0249368 A1* 10/2009 Needamangala ... G06F 11/3668 719/328
2011/0016460 A1* 1/2011 Archambault ...... G06F 11/3466 717/158
2014/0149969 A1* 5/2014 Brower ................... G06F 8/423 717/140
2019/0369975 A1* 12/2019 Maor .................. G06F 11/3624
2024/0103818 A1* 3/2024 Gallagher ............... G06F 21/44

FOREIGN PATENT DOCUMENTS

CN 110045951 B * 4/2022 ............... G06F 8/30
CN 120256067 A * 7/2025 ............. G06F 9/544
WO WO-2019077607 A1 * 4/2019 ............. G06F 8/658

* cited by examiner

*Primary Examiner* — Philip Wang
(74) *Attorney, Agent, or Firm* — Nields, Lemack & Frame, LLC

(57) ABSTRACT

A system and method for determining the placement of software functions at link time is disclosed. The system utilizes special annotations that are included in software modules of the source code, which defines certain parameters associated with each function. These parameters may be referred to as code classification components, wherein each code classification component may include one or more code classes associated with that code classification component. These software modules are then compiled. A linker script is created based on the desired configuration. The linker then uses the linker script to determine which software modules should be placed in RAM for improved execution speed.

19 Claims, 2 Drawing Sheets

CODE CLASSIFICATION FOR LINK-TIME CODE PLACEMENT

FIELD

This disclosure describes systems and methods for classifying code such that decisions regarding code placement may be made during link time.

BACKGROUND

In certain hardware platforms, it may be advantageous to execute at least a portion of the code from a random access memory (RAM), rather than a nonvolatile memory due to speed of access and predictability of execution time.

Further, certain vendors may provide a software development kit (SDK) for use by its customers. This SDK may include various modules that were written and previously compiled which perform a specific function. For example, a vendor of network devices may provide an SDK that includes network stacks for different protocols, such as Bluetooth, Zigbee and others. Further, the vendor may also offer a plurality of different hardware platforms, which may include different amounts of memory, different processing units, and different functionality.

For example, some of these hardware platforms may support internal or external RAM that may be used to contain instructions to be executed by the processing unit. Other platforms may not support the use of RAM for instructions. Additionally, in those platforms where internal or external RAM may be used for instructions, the amount of available RAM may vary for different platforms.

One approach to address this issue is to provide a plurality of different versions of each compiled software module, one for each possible hardware platform. However, the amount of effort to maintain these different versions and the likelihood of error may be unreasonable.

Thus, an improved method and system for creating a software image using pre-compiled software modules and user software modules would be beneficial.

SUMMARY

A system and method for determining the placement of software functions at link time is disclosed. The system utilizes special annotations that are included in software modules of the source code, which defines certain parameters associated with each function. These parameters may be referred to as code classification components, wherein each code classification component may include one or more code classes associated with that code classification component. These software modules are then compiled. A linker script is created based on the desired configuration. The linker then uses the linker script to determine which software modules should be placed in RAM for improved execution speed.

According to one embodiment, a method of linking software functions to form a software image is disclosed, wherein certain functions are to be stored in RAM and other functions are to be stored in ROM. The method comprises annotating one or more functions within a software module using labels, wherein the labels provide information about each function; compiling the software module to create a pre-compiled software module, wherein the pre-compiled software module is an object file; generating a linker script, which is used by a linker to combine one or more pre-compiled software modules and to select which functions from the one or more pre-compiled software modules are to be stored in RAM based on the labels; and using the linker to generate the software image from the one or more pre-compiled software modules. In some embodiments, the labels include a code classification component and a code class associated with the code classification component. In certain embodiments, the code classification component is related to performance. In certain embodiments, the code classification component is related to power consumption. In certain embodiments, the code classification component is related to a real time nature of the function. In certain embodiments, the linker script is used to select each function having a desired (code classification component, code class) combination to store in RAM. In some embodiments, the software module is compiled using GCC, and the annotating comprises using attributes. In some embodiments, the software module is compiled using IAR, and the annotating comprises using pragma. In some embodiments, the labels comprise keywords and the linker script is used to select each function annotated with a desired keyword to store in RAM. In some embodiments, the linker script utilizes wildcards to instruct the linker to scan the one or more pre-compiled software modules for a particular label. In some embodiments, a template is used to generate the linker script. In certain embodiments, configuration metadata is provided to the template to generate the linker script.

According to another embodiment, a system for generating a software image to be loaded on a remote device is disclosed. The system comprises a processing unit; and a computer readable non-transitory memory device, wherein the memory device comprises: one or more pre-compiled software modules, wherein at least one function in the one or more pre-compiled software modules is annotated using labels; a configuration file that identifies desired code classes that are to be stored in a volatile memory of the remote device; a linker; and a linker script that is generated using the configuration file and is used by the linker to parse the one or more pre-compiled software modules, identifying functions that are annotated with the desired code classes, wherein the linker combines the one or more pre-compiled software modules into the software image for the remote device. In some embodiments, the labels include a code classification component and a code class associated with the code classification component. In certain embodiments, the code classification component is related to performance. In certain embodiments, the code classification component is related to power consumption. In certain embodiments, the code classification component is related to a real time nature of the function. In some embodiments, the one or more pre-compiled software modules are compiled using GCC, and the annotating comprises using attributes. In some embodiments, the one or more pre-compiled software modules are compiled using IAR, and the annotating comprises using pragma.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
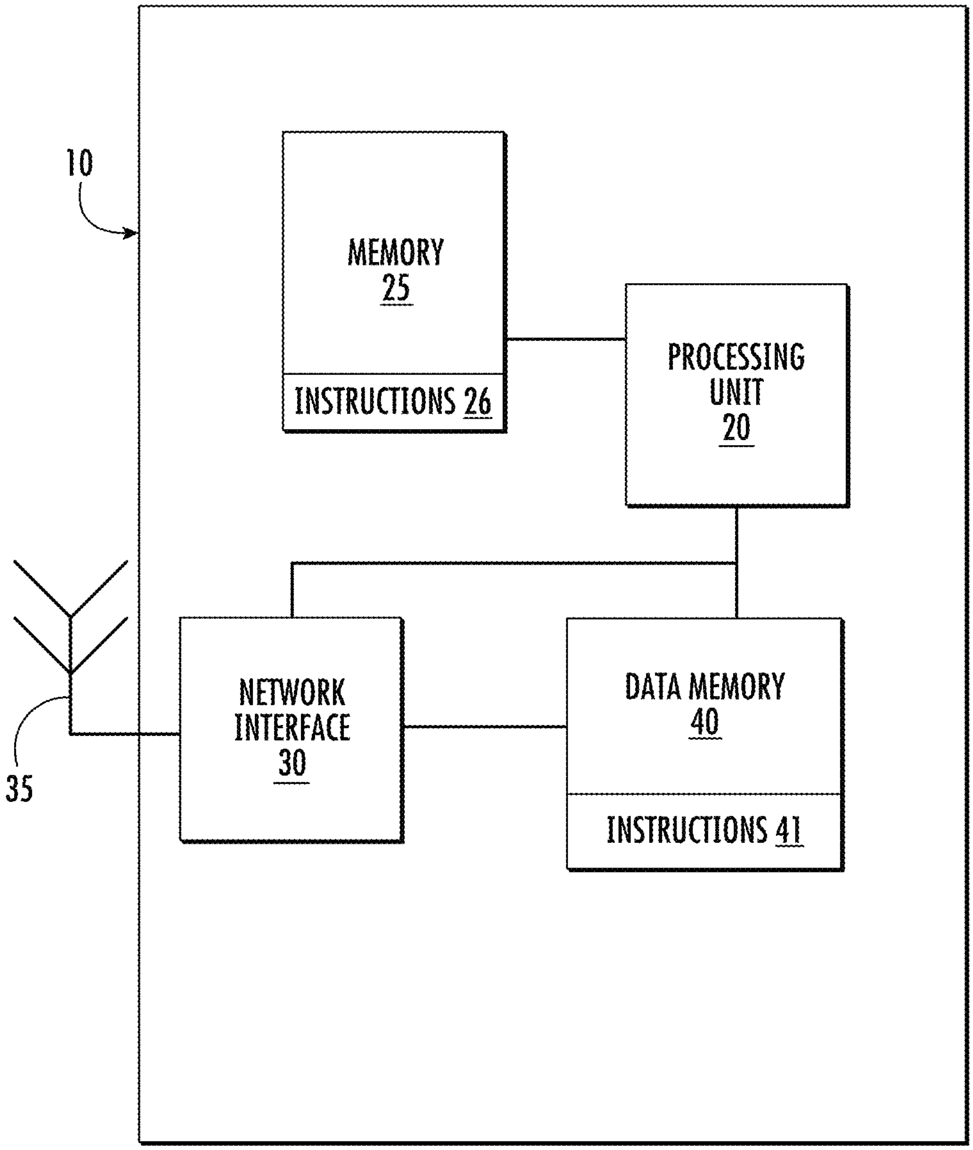
FIG. 1 shows a block diagram of a wireless network device that may utilize the software image described herein.

FIG. 1 shows a block diagram of a representative network device 10 according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support one or more wireless networks, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network. The network interface 30 includes a transmit circuit which is used to transmit data from this network device 10 using the antenna 35. The network interface 30 also includes a receive circuit which is used to receive packets.

The network device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the wireless network. Although not shown, the network device 10 also has a power supply, which may be a battery or a connection to a permanent power source, such as a wall outlet.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the network device 10, not its physical configuration. Further, while the above describes a network device, it is understood that this technique is applicable to any device that seeks to improve performance by executing instructions from RAM.

Further, in certain embodiments, the data memory device 40 may be used to retain other types of information. For example, for speed of execution, some or all of the instructions 26 in the memory device 25 may be copied to the data memory device 40 and saved as instructions 41. However, in other embodiments, the data memory device 40 does not include sufficient space to store any instructions 41.

The instructions 26 may be made up of a plurality of different software modules that are linked together to form a single software image. In some embodiments, this software image is generated using an SDK, which includes one or more pre-compiled software modules that may be used for the software image. These pre-compiled modules may include code associated with one of the network protocols supported by the network device 10.

In some embodiments, a portion of the code within these pre-compiled modules may preferably be disposed in data memory device 40 as instructions 41 to speed up execution of the code. However, as described above, in certain instantiations of the network device 10, there may be insufficient space to copy some or all of the instructions to the data memory device 40.

Therefore, a system and method for incorporating these pre-compiled software modules into a software image, where the linker places the most time critical code in data memory device 40 is needed. The software image may be in the form of a .elf file (Executable and Linkable Format) or in the form of a .bin file (binary).

Figure 2:
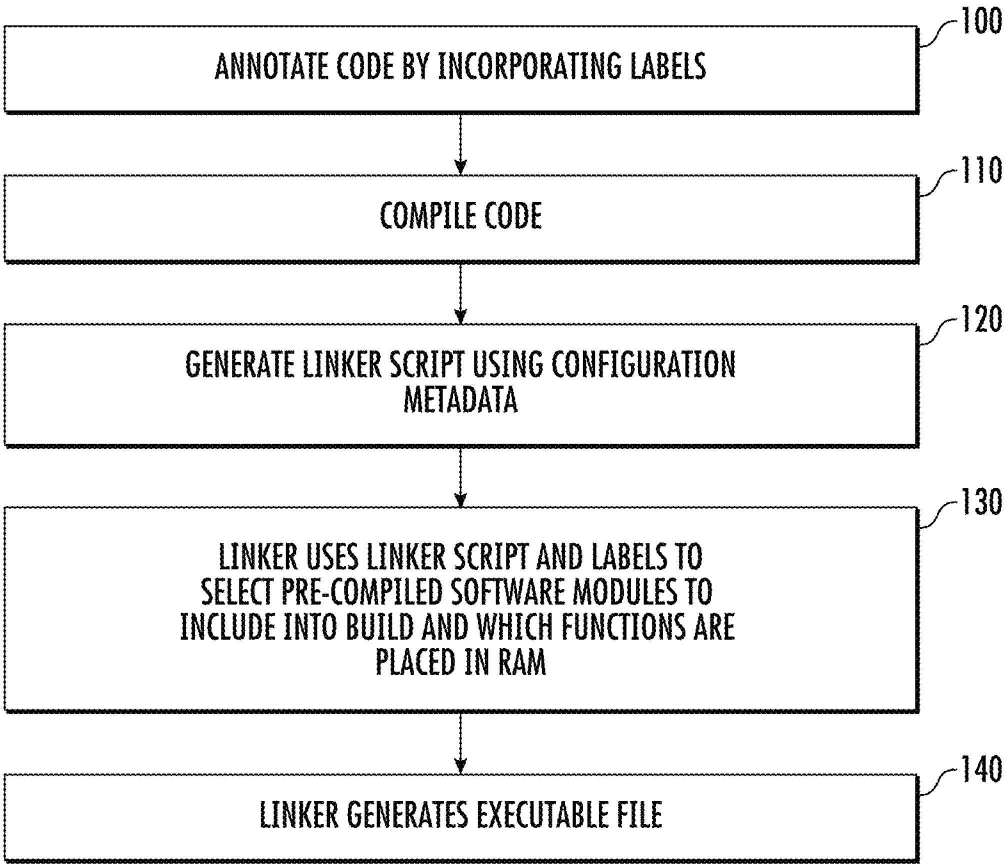
FIG. 2 shows a flowchart for creating the software image according to one embodiment.

FIG. 2 shows a flowchart that shows the build process to create a software image for a particular network device 10. This build process may be executed by a system that includes a processing unit and a computer readable non-transitory storage medium that contains the software components described below.

First, as shown in Box 100, the code is annotated using labels. The code may be disposed on any suitable computer readable non-transitory storage medium. Often, the code is developed on a device different from the network device 10. Further, this code may be developed on a device different from the system used to perform the build process. The terms “code” and “software module” may be used interchangeably in this disclosure. These labels are used to identify different characteristics of the software functions within the code, and may provide some information about the software functions. This information may include:

- The specific hardware platforms on which this function is used;
- The real time nature of the function;
- The performance requirements of the function;
- The power consumption of the function; and
- Other features.

For example, a certain function may operate correctly when executed in FLASH or another nonvolatile memory. However, the performance of that function may be improved if it is operating in RAM. This would be identified based on the performance requirement of the function. As another example, a function may operate periodically when the device is in sleep mode. Executing this function from FLASH or another nonvolatile memory may be very power intensive. Thus, to minimize power consumption when in sleep mode, it may be preferable that this function is located in RAM.

This information may be referred to as code classification components, and within each code classification component, are one or more different code classes. A particular software function may belong to any number of code classes. Further, if a function is not annotated, it will be placed in the default location, which may be FLASH ROM or another nonvolatile memory in certain embodiments.

For example, there may be one or more different code classification components. For example, one of these code classification components may be related to the platform software. Within this code classification component, there may be several code classes. These may be, for example, the name of the hardware platform being used. Additionally, the code classes may define a characteristic of the platform (high performance, real time, etc.). Alternatively, the code classes may define the purpose of the function, such as "sleep timer". More than one code class may be assigned to a particular code classification component. For example, a function may be defined as:

PLATFORM, codenameX;

PLATFORM, high performance, real time; or

PLATFORM, sleep timer.

Another example of a code classification component may be "real time operating system" (RTOS), which refers to code related to real time operation. Within this code classification component, the code classes may include "semaphore" and "mutex", among others. Of course, additional and/or different code classification components and code classes may be used. For this code classification component, a function may be defined as:

RTOS, semaphore.

This information may be incorporated into the code in several ways. For example, if the GCC (GNU Compiler Collection) compiler is used, these code classes may be introduced as attributes. As an example, a function that belongs to the rtos software component, and belongs to the timecritical code class may be annotated with:

'_attribute_((section("text_rtos_timecritical")))'.

If this same function also belongs to the mutex code class, it would be annotated instead as:

'_attribute_((section ("text_rtos_timecritical_mutex")))', or equivalently as:

'_attribute_((section ("text_rtos_mutex_timecritical")))'.

For the IAR compiler, these code classes may be introduced as Pragma. For example, a function that belongs to the rtos software component, and belongs to the timecritical code class may be annotated with:

'Pragma("location=\"text_rtos_timecritical\"")'.

If this same function also belongs to the mutex code class, it would be annotated instead as:

'Pragma("location=\"text_rtos_timecritical_mutex\"")' or equivalently as"

'Pragma("location=\"text_rtos_mutex_timecritical\"")'.

Once the appropriate code classification components and code classes have been incorporated into the software module, that software module may be compiled, as shown in Box 110. Note that the software module may be compiled on the system that performs the build process, or on a different device. This compiled software program does not need to be recompiled for other hardware platforms. Instead, a linker script is generated which is able to use the embedded code classification components and code classes to accommodate the different hardware platforms. Note that the compiled software modules may also be referred to as object files. A collection of these compiled software modules may be referred to as a pre-compiled library.

Next, as shown in Box 120, the linker script is generated. This linker script is provided as an input to the linker. A linker is a utility software program that takes object files and other input and generates a single executable file, often in the form of a .elf or .bin file.

In some embodiments, the linker script is generated using a template. For example, the template may receive various inputs, such as the hardware platform to be used, the functionality to be incorporated in that hardware platform and other parameters. In some embodiments, configuration metadata that defines which (code classification component, code class) combinations to filter may be used by the template to generate the linker script. The format of this configuration metadata is implementation dependent. In some embodiments, the configuration metadata may be disposed in a file that is accessible to the template. The configuration metadata is a common source that is, at some point, converted into the linker script that are compatible with either GCC or IAR. The linker script effectuates the filtration and placement of functions according to the configured selections.

As shown in Box 130, the linker script is used by the linker to select the compiled software modules that should be included in the build of the software image. Further, the linker script may also be used by the linker in conjunction with the annotations, to determine which functions (if any) should be included in the data memory device 40. For example, the parameters may indicate that the platform is high performance. In this example, the linker script will instruct the linker to parse every function looking for those functions that included the code classification component "platform". The linker would then check each of these functions to identify those that included the code class of "high performance" within that code classification component. Each of these functions would then be designated for placement within the data memory device 40.

Further, the GCC and IAR linker script directives support wildcard statements which may be leveraged to filter functions from the appropriately named input sections.

Note that the input to the linker are the linker script and object files, and the pre-compiled libraries are collections of these object files. Within these object files are the (code classification component, code class) combinations that are associated with specific functions. In some embodiments, the linker script may use wildcards to filter through the libraries, and by extension, the object files, for a given code classification component, a specific code class, or other item within a given object file, or a given library file. Finally, the linker generates an executable file, also referred to as the software image, as shown in Box 140. Note that Boxes 120-140 are typically performed by the same system.

Further, the linker script is also a software component that is disposed on any suitable computer readable storage medium. The linker script is disposed in a location where it is accessible to the linker.

While the above example creates (code classification component, code class) combinations, it is understood that other implementations are possible. For example, the annotations may include keywords, where the linker script instructs the linker to scan the functions for annotations that include that keyword.

The present system has many advantages. Note that by utilizing the code classification components and code classes, a software module may be pre-compiled and used in a plurality of different software images without the need to recompile. The code classification components and code classes are used by the linker script to inform the linker as to the operational requirements of each function. Further, this approach also allows a user to customize their application. For example, the user may select one or more pre-compiled software modules to include with their own custom software. The necessary parameters may be included in the linker script such that the appropriate functions from both the pre-compiled software modules and their own software modules are properly placed in the data memory device 40.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of linking software functions to form a software image, wherein certain functions are to be stored in random access memory (RAM) and other functions are to be stored in read only memory (ROM), the method comprising:

annotating one or more functions within a software module using labels, wherein the labels provide information about each function;

compiling the software module with the labels to create a pre-compiled software module, wherein the pre-compiled software module is an object file;

generating a linker script, which is used by a linker to combine one or more pre-compiled software modules and to select which functions from the one or more pre-compiled software modules are to be stored in RAM based on the labels; and using the linker to generate the software image from the one or more pre-compiled software modules.

2. The method of claim 1, wherein the labels include a code classification component and a code class associated with the code classification component.

3. The method of claim 2, wherein the code classification component is related to performance.

4. The method of claim 2, wherein the code classification related component is to power consumption.

5. The method of claim 2, wherein the code classification component is related to a real time nature of the function.

6. The method of claim 2, wherein the linker script is used to select each function having a desired (code classification component, code class) combination to store in RAM.

7. The method of claim 1, wherein the software module is compiled using GNU Compiler Collection (GCC), and wherein the annotating comprises using attributes.

8. The method of claim 1, wherein the software module is compiled using an IAR compiler, and wherein the annotating comprises using pragma.

9. The method of claim 1, wherein the labels comprise keywords and wherein the linker script is used to select each function annotated with a desired keyword to store in RAM.

10. The method of claim 1, wherein the linker script utilizes wildcards to instruct the linker to scan the one or more pre-compiled software modules for a particular label.

11. The method of claim 1, wherein a template is used to generate the linker script.

12. The method of claim 11, wherein configuration metadata is provided to the template to generate the linker script.

13. A system for generating a software image to be loaded on a remote device, comprising:

a processing unit; and a computer readable non-transitory memory device, wherein the memory device comprises:

one or more pre-compiled software modules, wherein at least one function in the one or more pre-compiled software modules is annotated using labels prior to being compiled;

a configuration file that identifies desired code classes that are to be stored in a volatile memory of the remote device;

a linker; and a linker script that is generated using the configuration file and is used by the linker to parse the one or more pre-compiled software modules, identifying functions that are annotated with the desired code classes, wherein the linker combines the one or more pre-compiled software modules into the software image for the remote device.

14. The system of claim 13, wherein the labels include a code classification component and a code class associated with the code classification component.

15. The system of claim 14, wherein the code classification component is related to performance.

16. The system of claim 14, wherein the code classification component is related to power consumption.

17. The system of claim 14, wherein the code classification component is related to a real time nature of the function.

18. The system of claim 13, wherein the one or more pre-compiled software modules are compiled using GNU Compiler Collection (GCC), and wherein the annotating comprises using attributes.

19. The system of claim 13, wherein the one or more pre-compiled software modules are compiled using an IAR compiler, and wherein the annotating comprises using pragma.

* * * * *